United States Patent

Spears, Jr.

(10) Patent No.: US 7,523,952 B1
(45) Date of Patent: Apr. 28, 2009

(54) TRAILER DEPTH GAUGE

(76) Inventor: Daniel C. Spears, Jr., 1510 Majesty Dr., Jefferson City, TN (US) 37760

( * ) Notice: Subject to any disclaimer, the term of this patent is extended or adjusted under 35 U.S.C. 154(b) by 215 days.

(21) Appl. No.: 11/703,870

(22) Filed: Feb. 9, 2007

(51) Int. Cl.
  *B60P 3/10* (2006.01)
(52) U.S. Cl. ............... 280/414.1; 114/344; 280/414.2; 280/414.3
(58) Field of Classification Search ... 280/414.1–414.3; 114/344; 441/13–18
See application file for complete search history.

(56) References Cited

U.S. PATENT DOCUMENTS

| | | | |
|---|---|---|---|
| 3,585,582 A | 6/1971 | Dove | |
| 3,821,699 A | 6/1974 | Marus et al. | |
| 3,873,130 A * | 3/1975 | Whitley, Jr. | 414/537 |
| 3,995,251 A | 11/1976 | Jones | |
| 4,011,958 A * | 3/1977 | Carrick | 414/529 |
| 4,077,076 A * | 3/1978 | Masters | 441/16 |
| 4,197,050 A * | 4/1980 | Larson | 414/529 |
| 4,507,016 A * | 3/1985 | Honour, VII | 405/2 |
| 4,553,897 A | 11/1985 | Briggs | |
| 4,858,943 A * | 8/1989 | Cote | 280/414.1 |
| 4,940,251 A | 7/1990 | Willmsen | |
| 5,060,963 A * | 10/1991 | Godbersen | 280/414.1 |
| 5,114,168 A * | 5/1992 | Kehl | 280/414.1 |
| 5,429,383 A * | 7/1995 | Reed | 280/414.1 |
| 5,515,025 A | 5/1996 | Barrows | |
| 5,596,944 A | 1/1997 | Massie | |
| 6,199,503 B1 | 3/2001 | Midgett | |
| 6,247,719 B1 * | 6/2001 | Youmans et al. | 280/414.1 |
| 6,923,138 B2 * | 8/2005 | Holbrook | 114/344 |
| 7,017,933 B2 * | 3/2006 | Mickley | 280/414.1 |
| 7,063,039 B2 | 6/2006 | Emerson et al. | |

* cited by examiner

*Primary Examiner*—Paul N Dickson
*Assistant Examiner*—Tashiana Adams
(74) *Attorney, Agent, or Firm*—Peter Loffler

(57) ABSTRACT

A gauge gives a driver of a tow vehicle a visual cue that the trailer is at a proper depth within the water to recover a boat onto the trailer. The gauge has a tubular housing with an open bottom with a float connected to a plunger slidably disposed within the housing. As water enters, the float and its attached plunger rise. Either the plunger reaches a transparent section of the housing and aligns with a band to signify proper trailer depth or the plunger depresses either a first switch for proper depth or a second switch for a too deep condition. Depression of the first switch either illuminates a first light to indicate the proper depth condition or has a meter indicate the proper depth condition while depression of the second switch either illuminates a second light to indicate a too deep condition or has a meter so indicate.

6 Claims, 5 Drawing Sheets

TRAILER DEPTH GAUGE

BACKGROUND OF THE INVENTION

1. Field of the Invention

The present invention relates to a device that is attached to a boat trailer in order to give the driver of a vehicle pulling the trailer a visual cue indicating that the trailer is at an appropriate water depth to recover the boat onto the trailer.

2. Background of the Prior Art

Boating is a great pastime. Sitting on the water and fishing or just doing nothing but floating is a great way to spend a day. As much fun as boating is, there is work, sometimes frustrating work, that goes into boat usage. As most people are not fortunate enough to actually live on the water, they must launch and recover their boats from a boat ramp. Launching is relatively straightforward, once backing a trailer is mastered of course. Just back the boat trailer into the water until the boat begins to float, float the boat clear of the trailer, pull the trailer back out of the water, and park the tow vehicle and trailer and go boating. If a driver is not sure if the trailer has reached a sufficient depth in the water that allows the boat to float clear of the trailer, the driver simply backs up sufficiently far to assure proper depth as there is no penalty for overshooting the ideal depth for the trailer for boat launch. The problem comes during boat recovery. The trailer must be positioned at an appropriate depth to achieve recovery of the boat, which appropriate depth is within a relatively narrow window. If the trailer is not deep enough within the water, the boat cannot pull up onto the trailer. If the trailer is too deep, then the boat may float free of the trailer possibly causing damage to the boat should it hit a nearby pier or other object and otherwise the boat is not recovered.

To address this problem, one person spots the trailer while another person backs up the tow vehicle and trailer. Once the trailer is at the appropriate depth, then the tow vehicle stops and the boat is recovered. The problem with this method is that oftentimes, a spotter is unavailable as one person needs to be driving the tow vehicle and another person needs to be driving the boat. A third person may not always be available. Even if a spotter is available, it is oftentimes difficult to pinpoint the appropriate depth of the trailer for proper boat recovery thereonto. A series of frustrating trial and error attempts must be made in order to achieve proper trailer depth. This problem is especially acute when a single person is towing and recovering, wherein such person must tie down the boat, exit the boat and back the trailer into the water, return to the boat and untie the boat and attempt to load the boat onto the trailer. If the trailer is at an improper depth, the boat must be once again tied down, exited, and the trailer depth adjusted. This trail and error method can be quite frustrating and time-consuming to the typical boater.

To address this problem, devices have been proposed that automatically determine when a trailer is at the appropriate depth within the water that assures proper boat recovery onto the trailer and give the driver a cue, either audio, visual, or both of such a condition. These devices, which work with varying degrees of competence, tend to be unusually complex in design and construction making them relatively expensive to manufacture and obtain by a typical boat owner. Additionally, some such devices require extensive modifications to the trailer, which modifications many trailer owners are unwilling to make.

Accordingly, a device is needed that can quickly and accurately determine when a boat trailer is at the proper depth within the water to allow a boat to be easily recovered onto the waiting trailer. Such a device must be of relatively simple design and construction so that it is relatively inexpensive to manufacture so as to be affordable to a large segment of boat trailer owners. Such a device must be relatively simple to install so that extensive modifications to the trailer are not required.

SUMMARY OF THE INVENTION

The trailer depth gauge of the present invention addresses the aforementioned needs in the art by providing a device that quickly and accurately determines when a boat trailer is at the proper depth within the water in order to allow a boat to be recovered onto the waiting trailer. The trailer depth gauge is of relatively simple design and construction so that it is relatively inexpensive to manufacture and is thus affordable to a large segment of boat trailer owners. The present invention is relatively simple to install so that extensive modifications to the trailer are not required.

The trailer depth gauge of the present invention is comprised of a hollow tubular housing that has an open bottom and a top that has a transparent section. A band encompasses a portion of the transparent section. A float is disposed within an internal chamber of the housing and is capable of sliding therein. A plunger is disposed within the internal chamber of the housing and is attached to the float via a rod such that the plunger is closer to the top and the float is closer to the bottom. The housing is attached to a rear portion of the trailer such that the top is facing skywardly and such that as the trailer is lowered into the body of water, the water enters the housing through the bottom causing the float and the attached plunger to rise within the internal chamber. Once the plunger aligns with the band, the trailer is at the proper depth. Alternately, the trailer depth gauge comprises a hollow tubular housing that has an open bottom and a top that has a transparent section. A first light is disposed within the housing and is visible through the transparent section. A first switch is electrically connected to the first light such that depression of the first switch causes the first light to illuminate. A second light is disposed within the housing and is visible through the transparent section. A second switch is electrically connected to the second light such that depression of the second switch causes the second light to illuminate. A float is disposed within an internal chamber of the housing and is capable of sliding therein. A plunger is disposed within the internal chamber of the housing and is attached to the float via a rod such that the plunger is closer to the top and the float is closer to the bottom. The housing is attached to a rear portion of the trailer such that the top is facing skywardly and such that as the trailer is lowered into the body of water, the water enters the housing through the bottom causing the float and the attached plunger to rise within the internal chamber such that the float first depresses the first switch and with subsequent rise of the plunger, the plunger undepresses the first switch and immediately depresses the second switch. As a further alternative, the trailer depth gauge comprises a hollow tubular housing that has an open bottom and a top. A first switch and a second switch each disposed within the housing. A meter has a first region, a second region, and a third region, the meter also has a needle to indicate in one of the three regions. The meter is in signal communication with the first switch and the second switch. A float is disposed within an internal chamber of the housing and is capable of sliding therein. A plunger is disposed within the internal chamber of the housing and is attached to the float via a rod such that the plunger is closer to the top and the float is closer to the bottom. The housing is attached to a rear portion of the trailer such that the top is facing skywardly and such that as the trailer is lowered into the body of water, the water enters the housing through the bottom causing the float and the attached plunger to rise within the internal chamber such that the float first depresses the first switch causing the needle to indicate in the second region and with subsequent rise of the plunger, the plunger undepresses the first switch and immediately depresses the second switch causing the needle to indicate in the third region. When neither the first switch nor the second switch is depressed, the needle indicates in the first region. In all embodiments, the housing has a pair of aligned openings located proximate the bottom thereof and a pin passing through the aligned openings. In all embodiments, the housing may either be strapped to one of the guide posts of the trailer or may replace one of the guide posts of the trailer.

BRIEF DESCRIPTION OF THE DRAWINGS

FIG. 1A is a close-up view of the trailer depth gauge attached to the trailer.

Similar reference numerals refer to similar parts throughout the several views of the drawings.

DESCRIPTION OF THE PREFERRED EMBODIMENT

Figure 1:
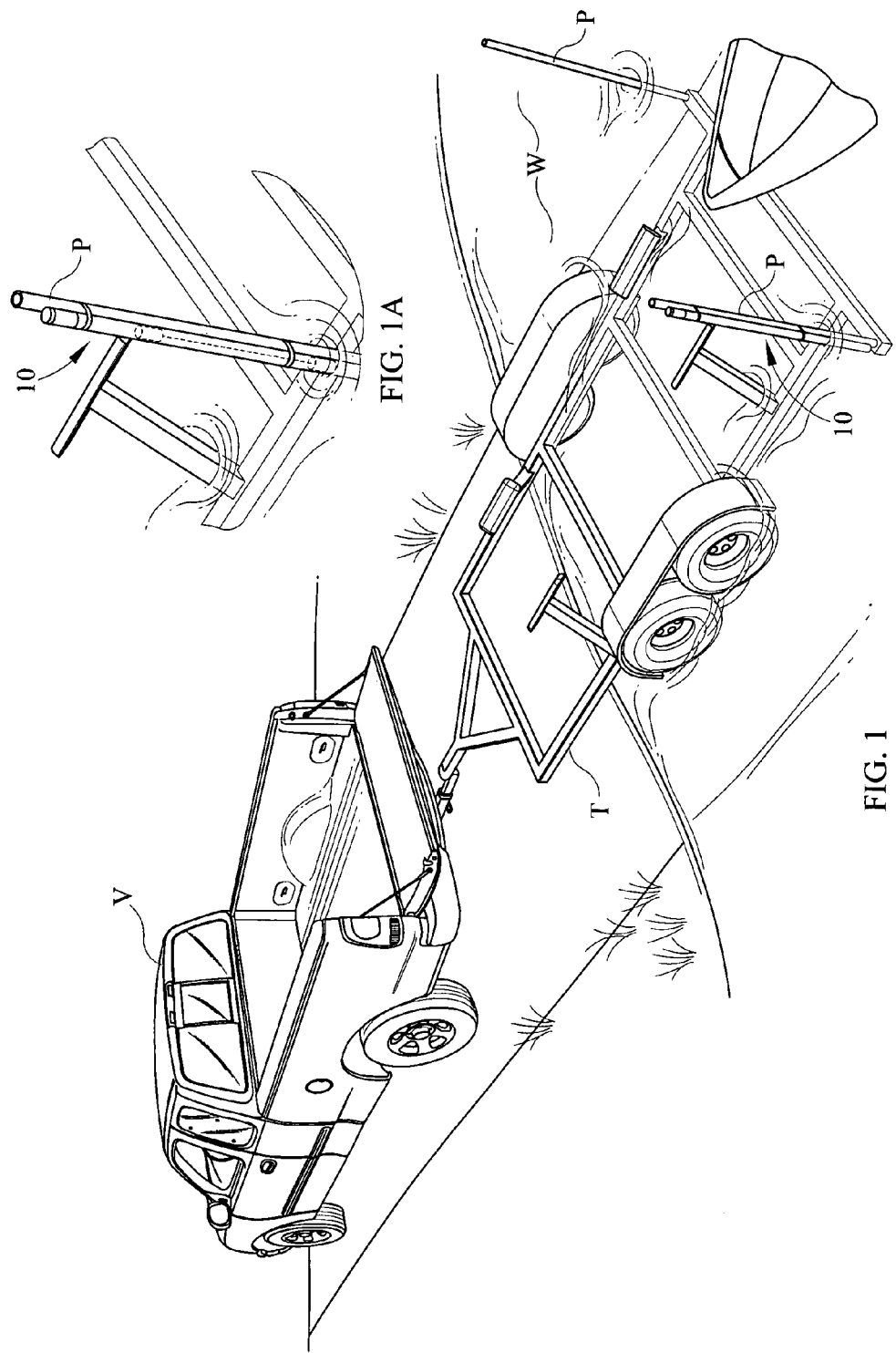
FIG. 1 is an environmental view of the trailer depth gauge of the present invention installed on a boat trailer being lowered into water.
Figure 2:
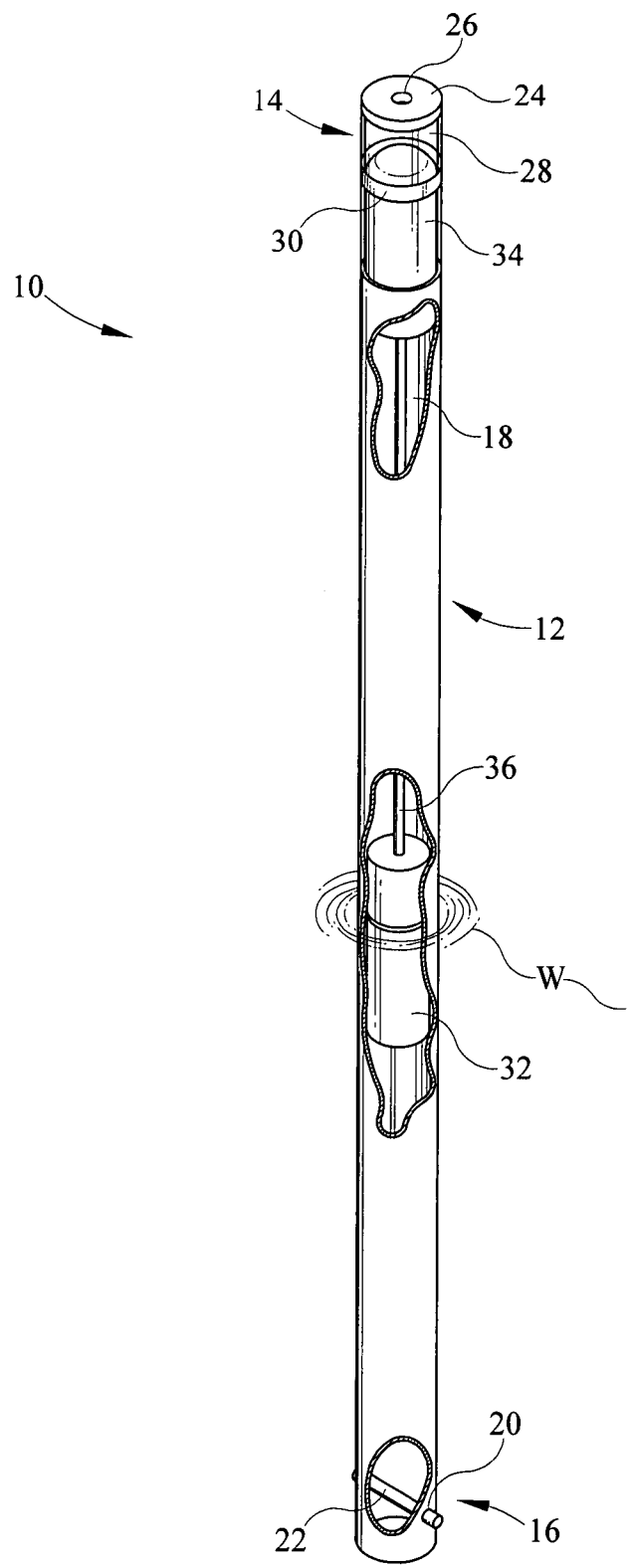
FIG. 2 is an elevation view, partially cutaway, of the trailer depth gauge.

Referring now to the drawings, it is seen that the trailer depth gauge of the present invention, generally denoted by reference numeral 10, is comprised of a tubular housing 12 having a top end 14 and a bottom end 16 and an internal chamber 18. The housing 12 may be made from any appropriate material such as PVC. Located proximate the bottom end 16 is a pair of aligned openings 20 through which a pin 22 can pass. A cap 24 is located on the top end 14 and has a vent opening 26 thereon. The upper portion 28 of the housing 12, proximate the top end 14 is transparent. A band 30 encompasses a section of the transparent upper portion 28. A float 32 is disposed within the internal chamber 18 and is connected to a plunger 34 via a rod 36. The float 32 and attached plunger 34 are capable of sliding up and down within the internal chamber 18 of the housing 12.

Figures 5, 5A:
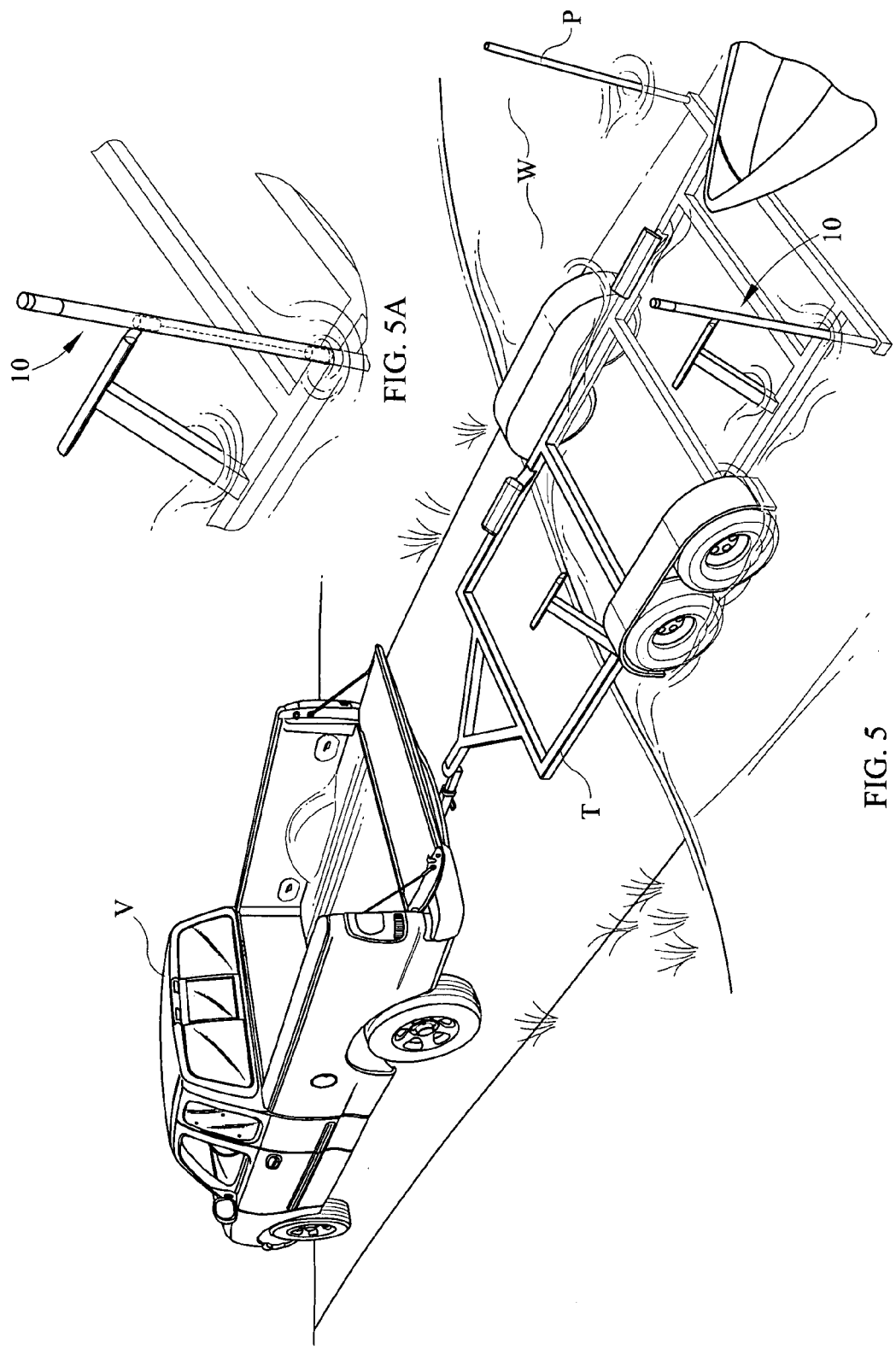
FIG. 5 is an environmental view of the trailer depth gauge installed onto a boat trailer being lowered into water illustrating an alternate trailer installation technique.
FIG. 5A is a close-up view of the trailer depth gauge attached to the trailer of FIG. 5.

In order use the trailer depth gauge 10 of the present invention, the housing 12 is attached to a rear portion of a boat trailer T. As seen in FIGS. 1 and 1A, the housing 12 is attached to one of the guide posts P of the trailer T by using straps 38 to strap around the housing 12 and one of the guide posts P. Alternately, as seen in FIGS. 5 and 5A, the housing 12 has the same diameter as that of the guide posts P of the trailer T such that one of the guide posts P, preferably the driver's side guide post P, is removed from the trailer T and replaced with the housing 12. The openings 20 on the housing 12 align with openings (not illustrated) on the trailer T such that the pin 22 passes through the various aligned openings in order to secure the housing 12 to the trailer T (it being recognized that if the trailer T uses an alternate attachment mechanism for its guide posts P, then such alternate attachment mechanism is employed to attach the housing 12 to the trailer T). As the trailer T backs up into the water W, the bottom end 16 of the housing 12 becomes submerged. Water W enters the internal chamber 18 of the housing 12 through the open bottom end 16. As the water W level within the internal chamber 18 rises, corresponding to increases of the depth of the trailer T within the water W, the float 32, which is buoyant, rises in lockstep with the rising water W level, the vent opening 26 releasing any pressure caused by the rising water W. Corresponding, the attached plunger 34 also rises. Once the plunger 34 rises to the level of the band 30, the trailer T is at the appropriate depth within the water W to allow a boat to be successfully recovered onto the trailer T in a single attempt.

The height of the housing 12 and the placement of the band 30 are calibrated so as to achieve this result. If the band 30 is not permanent—that is the band 30 is not in place at initial manufacture of the device 10 then the trailer T is placed into the water W to the desired depth for the boat that uses the trailer T and the band 30 is placed onto the housing 12 in some appropriate form such as by inking the band 30 onto the transparent portion 28, taping the band 30 onto the transparent portion, abrading the band 30 onto the transparent portion in order to make that portion of the transparent portion 28, translucent, etc. If the band 30 is initially permanent, then either the housing 12 is strapped onto the guide post P at the appropriate height for the housing 12 or if the housing 12 replaces the guide post P, sufficient length of the bottom end 16 of the housing 12 is cut away so as to make the housing 12 the appropriate height for the plunger 34 to align with the band 30. If needed, additional openings 20 are drilled into the bottom end 16 of the housing 12.

A driver backing the tow vehicle V watches the rising plunger 34 and once the plunger 34 reaches the level of the band 30, signifying proper trailer T depth, the tow vehicle V is stopped and the boat is recovered onto the trailer T. Thereafter, the trailer T and its boat are towed home in the usual way. The water W that entered the internal chamber 18 of the housing 12 drains out of the bottom end 16 of the housing 12 causing the float 32 and plunger 34 to drop back down. The pin 22 prevents the float 32 from falling out of the bottom end 16 of the housing 12.

Figure 3A:
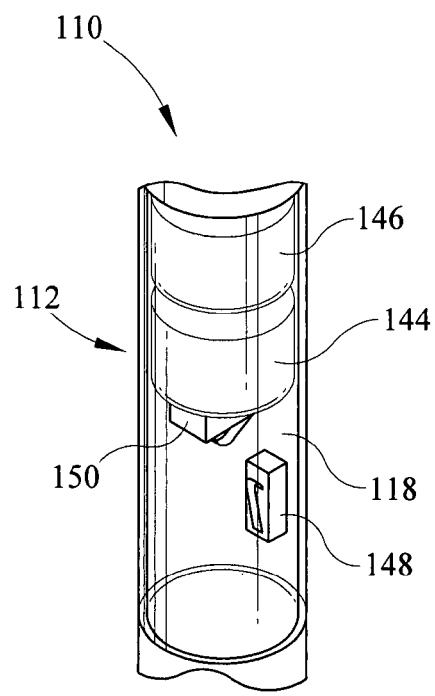
FIG. 3A is a close-up view of the visual cue producing mechanism utilized by the trailer depth gauge of FIG. 3.
Figure 3:
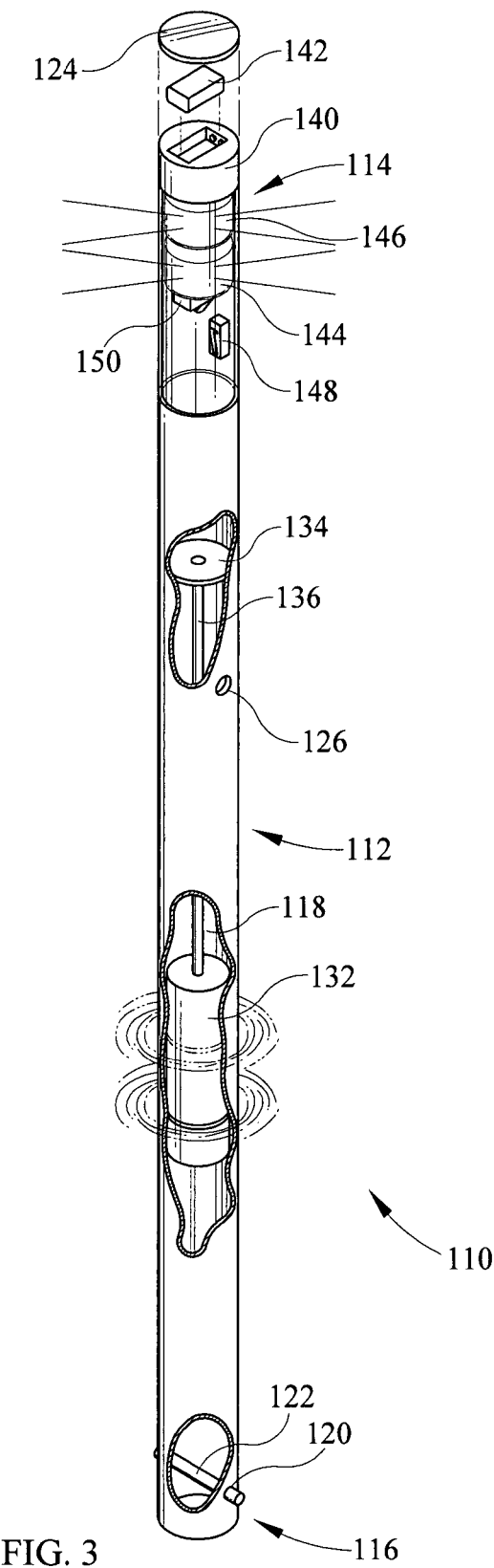
FIG. 3 is an elevation view, partially cutaway, of an alternate embodiment of the trailer depth gauge of the present invention.

As seen in FIGS. 3 and 3A, an alternate embodiment of the trailer depth gauge 110 of the present invention comprises a tubular housing 112 having a top end 114 and a bottom end 116 and an internal chamber 118. The housing 112 may be made from any appropriate material such as PVC. Located proximate the bottom end 116 is a pair of aligned openings 120 through which a pin 122 can pass. A plug 140 is inserted into the top end 114 and has a battery 142 stored therein. A removable cap 124 covers the battery chamber of the plug 140. A vent opening 126 is located on the sidewall of the housing 112. The upper portion 128 of the housing 112, proximate the top end 114, is transparent. A first light 144 is disposed within the transparent upper portion 128 of the housing 112 as is a second light 146. A first switch 148 is located within the housing 112 as is a second switch 150. The first light 144, the second light 146, the first switch 148 and the second switch 150 are each electrically connected with the battery 142 such that depression of the first switch 148 causes the first light 144, which may, but need not be green in color, to illuminate, while depression of the second switch 150 causes the second light 146, which may but need not be red, to illuminate. A float 132 is disposed within the internal chamber 118 and is connected to a relatively thin plunger 134 via a rod 136. The float 132 and attached plunger 134 are capable of sliding up and down within the internal chamber 118 of the housing 112.

In order use the alternate embodiment of the trailer depth gauge 110 of the present invention, the housing 112 is attached to a rear portion of a boat trailer T in similar fashion to the manner in which the housing 12 of the previous embodiment 10 is attached. As the trailer T backs up into the water W, the bottom end 116 of the housing 112 becomes submerged. Water W enters the internal chamber 118 of the housing 112 through the open bottom end 116. As the water W level within the internal chamber, 118 rises, corresponding to increases of the depth of the trailer T within the water W, the float 132, which is buoyant, rises in lockstep with the rising water W level, the vent opening 126 releasing any pressure caused by the rising water W. Correspondingly, the plunger 134 also rises. Once the plunger 134 rises to the level of the first switch 148, the plunger 134 depresses this first switch 148 causing the first light 144 to illuminate, signaling to the driver of the tow vehicle V that the trailer T is at the appropriate depth within the water W to allow a boat to be successfully recovered onto the trailer T. If the driver backs up any further, then the plunger 134 continues to rise and releases contact with the first switch 148, causing the first light 144 to run off, and the plunger 134 immediately gains contact with the second switch 150 causing the second light 146 to illuminate, signaling to the driver that the trailer T is too deep within the water W.

Accordingly, a driver backs the tow vehicle V up and watches the lights 144 and 146 on the housing 112. When neither light 144 or 146 is illuminated, the trailer T is not deep enough within the water W and the driver keeps backing up. Once the first light 144 (preferably green) is illuminated, the driver stops the tow vehicle V and the boat is loaded onto the trailer T. If the driver backs up too far, then the second light 146 (preferably red) is illuminated and the driver knows to pull the tow vehicle V forward until the first light 144 is illuminated.

The height of the housing 112 is calibrated so as to achieve this result. The trailer T is placed into the water W to the desired depth for the boat that uses the trailer T. The housing 112 is either strapped onto the guide post P at the appropriate height for the housing 112 (plunger 134 making contact with the first switch 148) or if the housing 112 replaces the guide post P, sufficient length of the bottom end 116 of the housing 112 is cut away so as to make the housing 112 the appropriate height for the plunger 134 to align with the first switch 148 at the proper trailer T depth. If needed, additional openings 120 are drilled into the bottom end 116 of the housing 112.

A driver backing the tow vehicle V watches the lights 144 and 146 and once the first light 144 is illuminated, signifying proper trailer T depth, the tow vehicle V is stopped and the boat recovered onto the trailer T. If the second light 146 illuminates, the driver pulls forward until the first light 144 illuminates. Thereafter, the trailer T and its boat are towed home in the usual way. The water W that entered the internal chamber 118 of the housing 112 drains out of the bottom end 116 of the housing 112 causing the float 132 and plunger 134 to drop back down. The pin 122 prevents the float 132 from falling out of the bottom end 116 of the housing 112.

Figures 4, 4A:
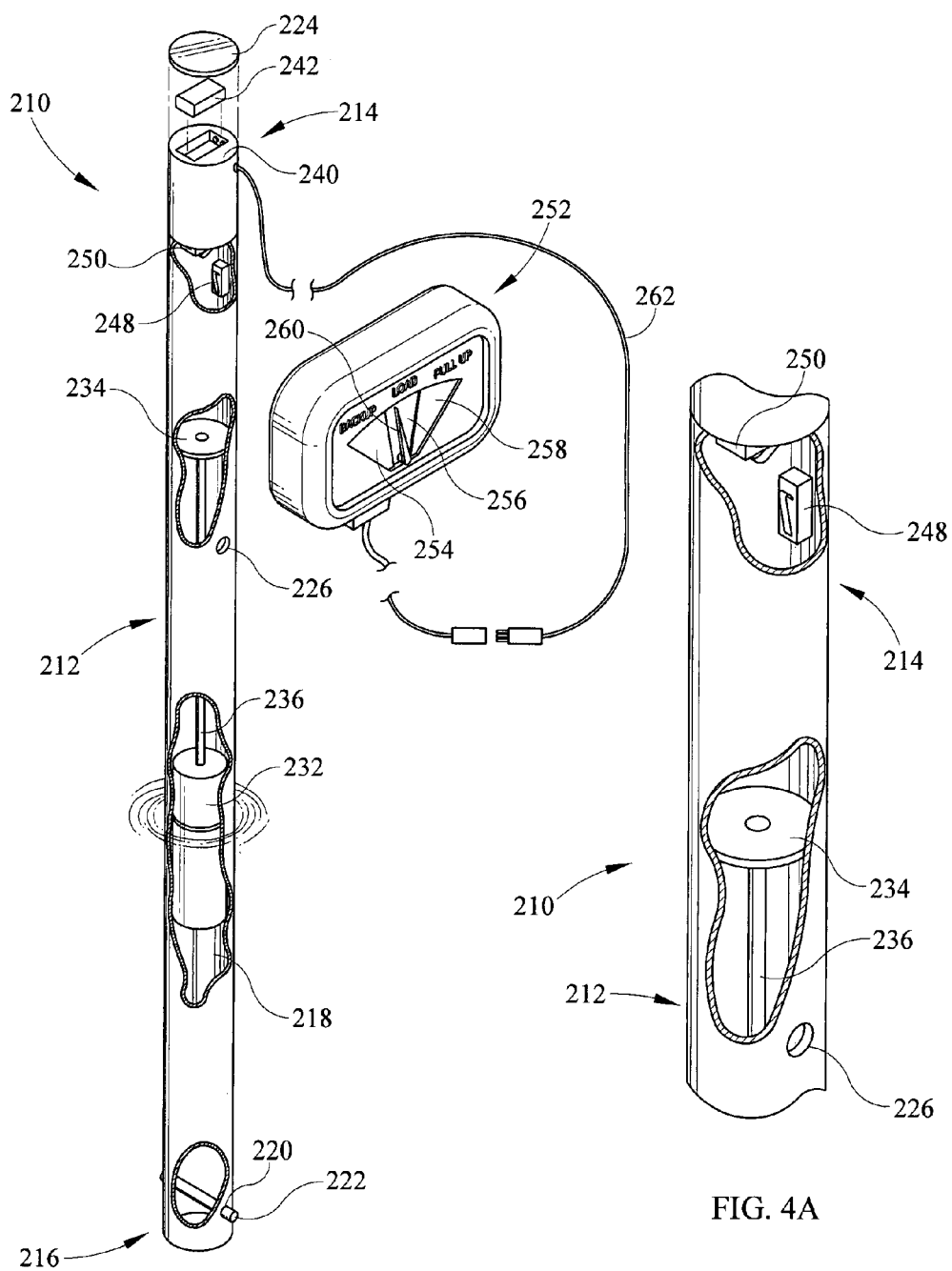
FIG. 4 is an elevation view, partially cutaway, of a second alternate embodiment of the trailer depth gauge of the present invention.
FIG. 4A is a close-up view of the plunger mechanism by the trailer depth gauge of FIG. 4.

As seen in FIGS. 4 and 4A, a second alternate embodiment of the trailer depth gauge 210 of the present invention is similar to the first alternate embodiment of the trailer depth gauge 110, and comprises a tubular housing 212 having a top end 214 and a bottom end 216 and an internal chamber 218. The housing 212 may be made from any appropriate material such as PVC. Located proximate the bottom end 216 is a pair of aligned openings 220 through which a pin 222 can pass. A plug 240 is inserted through the top end 214 and has a battery 242 stored therein. A removable cap 224 covers the battery chamber of the plug 240. A vent opening 226 is located on the sidewall of the housing 212. A first switch 248 is located within the housing 212 as is a second switch 250. A meter 252 has three regions, region one 254, region two 256, and region three 258, each of which is appropriately labeled. A needle 260 points to one of the three regions 254, 256 or 258. The first switch 248 and the second switch 250 are each electrically connected with the battery 242 and with the meter 252, either wirelessly or via the illustrated wire 262, such that depression of the first switch 248 causes the needle 260 to move into the second region 256 while depression of the second switch 250 causes the needle 260 to move into the third region 258. If neither switch 248 or 250 is depressed, the needle indicates in the first region 254. A float 232 is disposed within the internal chamber 218 of the housing 212 and is connected to a relatively thin plunger 234 via a rod 236. The float 232 and attached plunger 234 are capable of sliding up and down within the internal chamber 218 of the housing 212.

In order use the second alternate embodiment of the trailer depth gauge 210 of the present invention, the housing 212 is attached to a rear portion of a boat trailer T in similar fashion to the manner in which the housing 12 of the first embodiment is attached. As the trailer T backs up into the water W, the bottom end 216 of the housing 212 becomes submerged. Water W enters the internal chamber 218 of the housing 212 through the open bottom end 216. As the water W level within the internal chamber 218 rises, corresponding to increases of the depth of the trailer T within the water W, the float 232, which is buoyant, rises in lockstep with the rising water W level, the vent opening 226 releasing any pressure caused by the rising water W. Correspondingly, the plunger 234 also rises. Once the plunger 234 rises to the level of the first switch 248, the plunger 234 depresses this first switch 248 causing the needle 260 to indicate in the second region 256, signaling to the driver of the tow vehicle V that the trailer T is at the appropriate depth within the water W to allow a boat to be successfully recovered onto the trailer T. If the driver backs up any further, then the plunger 234 continues to rise and releases contact with the first switch 248 and immediately gains contact with the second switch 250 causing the needle 260 to indicate in the third region 258, signaling to the driver that the trailer T is too deep within the water W.

Accordingly, a driver backs the tow vehicle V up and watches the meter 252 that he is either holding or that is fixed within the tow vehicle V. When the needle 260 indicates in the first region 254, the trailer T is not deep enough within the water W and the driver keeps backing up. Once the needle 260 indicates in the second region 256 (first switch 248 depressed), the driver stops the tow vehicle V and the boat is loaded onto the trailer T. If the driver backs up too far, then the needle 260 indicates in the third region 258 (second switch 250 depressed) and the driver knows to pull the tow vehicle V forward until the needle 260 indicates in the second region 256.

The height of the housing 212 is calibrated so as to achieve this result. The trailer T is placed into the water W to the desired depth for the boat that uses the trailer T. The housing 212 is either strapped onto the guide post P at the appropriate height for the housing 212 (plunger 234 making contact with the first switch 248) or if the housing 212 replaces the guide post P, sufficient length of the bottom end 216 of the housing 212 is cut away so as to make the housing 212 the appropriate height for the plunger 234 to align with the first switch 248. If needed, additional openings 220 are drilled into the bottom end 216 of the housing 212.

A driver, having the meter 252 in view, backs the tow vehicle V and watches the meter 252 and once the needle 260 indicates in the second region 256 of the meter 252, signifying proper trailer T depth, the tow vehicle V is stopped and the boat recovered onto the trailer T. If the needle 260 indicates in the third region 258 of the meter 252, the driver pulls forward until the needle 260 indicates in the second region 256 of the meter 252. Thereafter, the trailer T and its boat are towed home in the usual way. The water W that entered the internal chamber 218 of the housing 212 drains out of the bottom end 216 of the housing 212 causing the float 232 and plunger 234 to drop back down. The pin 222 prevents the float 232 from falling out of the bottom end 216 of the housing 212.

While the invention has been particularly shown and described with reference to an embodiment thereof, it will be appreciated by those skilled in the art that various changes in form and detail may be made without departing from the spirit and scope of the invention.

I claim:

1. A gauge to determine the depth of a trailer within a body of water, the gauge comprising:
    a hollow tubular housing having an open bottom and a top that has a transparent section;
    a first light disposed within the housing and visible through the transparent section;
    a first switch electrically connected to the first light such that depression of the first switch causes the first light to illuminate;
    a second light disposed within the housing and visible through the transparent section;
    a second switch electrically connected to the second light such that depression of the second switch causes the second light to illuminate;
    a float disposed within an internal chamber of the housing and capable of sliding therein;
    a plunger disposed within the internal chamber of the housing and attached to the float via a rod such that the plunger is closer to the top and the float is closer to the bottom; and
    wherein the housing is adapted to be attached to a rear portion of the trailer such that the top is facing skywardly and such that as the trailer is lowered into the body of water, the water enters the housing through the bottom causing the float and the attached plunger to rise within the internal chamber, the float first depressing the first switch and with subsequent rise of the plunger, the plunger undepressing the first switch and immediately depressing the second switch.

2. The gauge as in claim 1 further comprising:
    a pair of aligned openings located proximate the bottom of the housing;
    a pin passing through the aligned openings.

3. The gauge as in claim 1 in combination with the trailer.

4. The gauge as in claim 1 further comprising:
    a pair of aligned openings located proximate the bottom of the housing;
    a pin passing through the aligned openings.

5. The gauge as in claim 4 wherein the housing is strapped to a guide post of the trailer.

6. The gauge as in claim 4 wherein the gauge replaces one of the guide posts of the trailer.

\* \* \* \* \*